United States Patent [19]
Dick

[11] Patent Number: 5,503,602
[45] Date of Patent: Apr. 2, 1996

[54] CLUTCH ACTUATING DEVICE HAVING PILOT CLUTCHES FOR USE IN A VEHICLE INTERAXLE DIFFERENTIAL

[75] Inventor: Wesley M. Dick, Fort Wayne, Ind.

[73] Assignee: Dana Corporation, Toledo, Ohio

[21] Appl. No.: 273,644

[22] Filed: Jul. 12, 1994

[51] Int. Cl.⁶ .......................... F16D 13/04; F16D 41/00; F16H 48/30; F16H 37/08
[52] U.S. Cl. .......................... 475/204; 475/150; 475/205; 192/35; 192/94
[58] Field of Search .......................... 475/198, 199, 475/150, 154, 204, 205, 206, 248; 192/35, 70.23, 93 A, 94; 74/665 T

[56] References Cited

U.S. PATENT DOCUMENTS

| | | | |
|---|---|---|---|
| 872,062 | 11/1907 | Hilliard | 192/70.11 |
| 880,664 | 3/1908 | Hilliard | 192/70.2 |
| 2,008,967 | 7/1935 | Rossmann | 192/35 |
| 2,061,787 | 11/1936 | Warner | 192/40 |
| 2,072,832 | 3/1937 | Weydell | 192/3.56 |
| 2,623,619 | 12/1952 | Clerk | 192/35 |
| 3,724,619 | 4/1973 | Miller | 192/18 |
| 4,645,049 | 2/1987 | Matsuda et al. | 192/35 |
| 4,677,877 | 7/1987 | Anderson et al. | 475/154 |
| 4,733,577 | 3/1988 | Griessert et al. | 475/150 |
| 4,738,163 | 4/1988 | Anderson et al. | 475/321 |
| 4,753,330 | 6/1988 | Ohzono et al. | 192/48.4 |
| 4,914,978 | 4/1990 | Moroto et al. | 475/205 X |
| 4,966,267 | 10/1990 | Carlton | 192/48.91 |
| 4,976,347 | 12/1990 | Sakakibara et al. | 192/20 |
| 5,083,986 | 1/1992 | Teraoka et al. | 475/86 |
| 5,156,578 | 10/1992 | Hirota | 475/150 |
| 5,199,325 | 4/1993 | Reuter et al. | 74/861 |

OTHER PUBLICATIONS

U.S. Patent Application by Dick et al., in its entirety, having S/N 08/273,722, filed Jul. 12, 1994 entitled "Clutch Actuating Device For Use In A Vehicle Drivetrain Subassembly".

U.S. Patent Application by Dick, in its entirety, having S/N 08/273,868, filed Jul. 12, 1994 entitled "ClutchActuating Device For Use In A Vehicle Drivetrain Subassembly".

*Primary Examiner*—Khoi Q. Ta
*Attorney, Agent, or Firm*—Oldham & Oldham Co.

[57] ABSTRACT

A clutch actuating device for use in a vehicle drivetrain subassembly having a clutch and a rotatable drive member, including first and second rotating members which are rotatably mounted to the drive member and are free to rotate relative to one another and relative to the drive member. The first and second rotating members engage one another so as to cause axial translation relative to one another in response to relative rotation between one another due to the engagement of ramp surfaces included on each member or, alternatively, due to the engagement of screw threads formed on each member. A gear system is connected to the first and second rotating members for differentially driving them and for controlling a direction of rotation of the rotating members relative to the drive member. First and second pilot clutches, are connected to the gear system and the pilot clutches are selectively activated, and selectively grounded. Activation of one of the pilot clutches causes relative rotation between the first and second rotating members which results in engagement of the drivetrain subassembly clutch, and activating the other of the pilot clutches causes relative rotation between the first and second rotating members which results in disengagement of the drivetrain subassembly clutch. In a preferred embodiment, the first and second rotating members are attached to, and may be integrally formed with, first and second ring gears of a planetary gear set.

13 Claims, 6 Drawing Sheets

CLUTCH ACTUATING DEVICE HAVING PILOT CLUTCHES FOR USE IN A VEHICLE INTERAXLE DIFFERENTIAL

CROSS-REFERENCES

This application is related in subject matter to commonly assigned and concurrently filed U.S. Patent Applications having Ser. Nos. 08/273,722 and 08/273,868, each being filed on Jul. 12, 1994 now U.S. Pat. Nos. 5,462,496 and 5,465,820 respectively.

BACKGROUND OF THE INVENTION

The present invention relates generally to a clutch actuating device and, more particularly, to a clutch actuating device for use in a vehicle drivetrain subassembly.

Four-wheel drive systems for vehicles are being utilized to a greater extent, providing increased traction and safety of operation for the vehicle, particularly during inclement weather conditions or off highway conditions as compared to that provided by conventional two-wheel drive systems. Four-wheel drive systems typically include a torque transfer case which includes an input shaft connected to and driven by the output shaft of the main transmission, a rear output shaft connected to drive the rear wheels of the vehicle, a front output shaft connected to drive the front wheels of the vehicle, and means for drivingly connecting the input shaft to the front and rear output shafts.

In a known four-wheel drive system, characterized as a "part-time" system, a direct drive connection is provided between the front and rear output shafts of the transfer case when the vehicle is operated in a four-wheel drive mode. Such a direct drive connection does not permit the transfer case to accommodate different front and rear wheel speeds which can occur when turning the vehicle. Accordingly, the four-wheel drive mode is generally used only on a "part-time" basis, such as when lower friction road surface conditions, such as wet or snow covered pavement, may require increased traction capabilities. Consequently, the system may operate in either a two-wheel drive mode, a four-wheel drive mode or an "on-demand" four-wheel drive mode. A four-wheel drive clutch provides the direct drive connection between the front and rear output shafts of the transfer case. The four-wheel drive clutch is actuated using a rotary electric motor and an associated gear reduction mechanism which is required to provide the relatively high torque requirements necessary to bias the four-wheel drive clutch. While the aforementioned four-wheel drive clutch actuation system may be advantageously used in many applications, automotive design engineers are continually seeking to simplify, and consequently reduce the cost of, vehicle drivetrain systems.

SUMMARY OF THE INVENTION

The present invention is therefore directed to a clutch actuating device for use in a vehicle drivetrain subassembly having a clutch. According to a preferred embodiment of the present invention, the clutch actuating device comprises first and second rotating members which are rotatably mounted to a rotatable drive member of the vehicle drivetrain subassembly and are free to rotate relative to one another and relative to the drive member. The first and second rotating members engage one another so as to cause axial translation of each member relative to the other in response to relative rotation between them. Gear means are connected to the first and second rotating members for differentially driving them and for controlling a direction of rotation of the first and second rotating members relative to the drive member of the drivetrain subassembly. First and second pilot clutches, each comprising at least one rotatable plate, are connected to the gear means. The device further comprises means for selectively activating, thereby selectively grounding, the first and second pilot clutches, wherein activating one of the pilot clutches causes relative rotation between the first and second rotating members which causes the second member to translate axially relative to the first member so as to engage the drivetrain subassembly clutch, and wherein activating the other of the first and second pilot clutches causes relative rotation between the first and second rotating members which causes the second rotating member to translate axially relative to the first rotating member so as to disengage the drivetrain subassembly clutch.

A main advantage of the clutch actuating device of the present invention is that the force required by the operator or control means to actuate the vehicle drivetrain subassembly clutch is significantly smaller than with previous devices since most of the clutch actuation energy is provided by a rotating drive member of the drivetrain subassembly, thereby affording a simplified and cost reduced clutch actuation device.

BRIEF DESCRIPTION OF THE DRAWINGS

The aforementioned advantage, as well as other advantages of the present invention, will become apparent from the subsequent detailed description of the preferred embodiments when taken in conjunction with the accompanying drawings, wherein.

DETAILED DESCRIPTION

Figure 1:
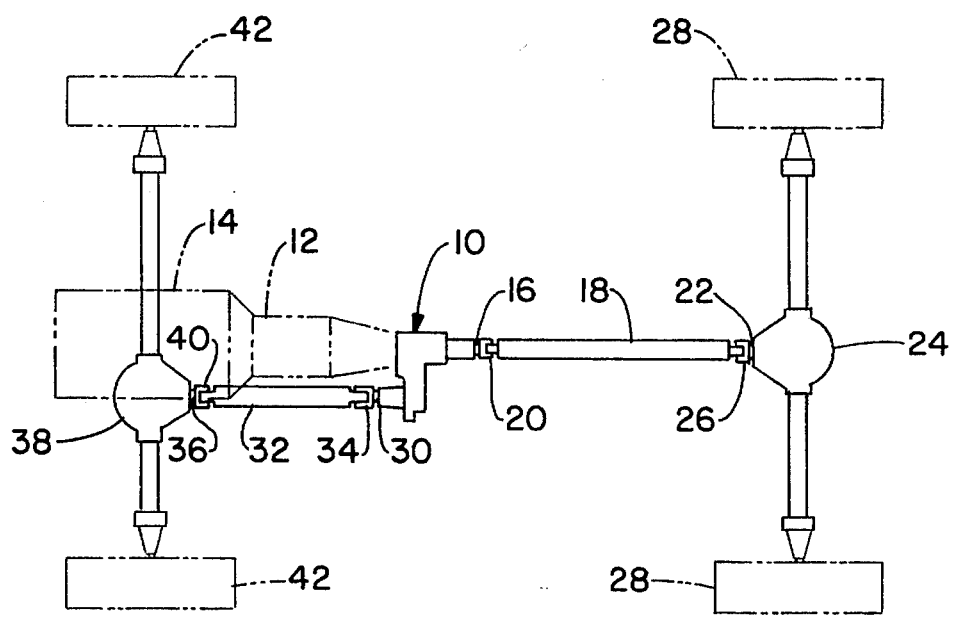
FIG. 1 is a top plan view illustrating a four-wheel drive system which may incorporate the clutch actuating device of the present invention.

Referring now to the drawings, FIG. 1 schematically illustrates a four-wheel drive system which includes a torque transfer case 10 which incorporates the clutch actuating device (not shown in FIG. 1) of the present invention. As shown in FIG. 1, torque transfer case 10 is coupled with a conventional transmission unit 12 which in turn is coupled to a vehicle drive engine 14. Transfer case 10 includes a rear output shaft or yoke 16 connected to the forward end of a rear drive shaft 18 by means of a conventional universal joint coupling 20. The rearward end of the drive shaft 18 is coupled to an input shaft or yoke 22 of a rear differential 24 by means of a universal joint coupling 26. The rear differential 24 is adapted to divide torque from the rear drive shaft 18 between the rear wheels 28 of the vehicle.

Transfer case 10 is also provided with a front output shaft or yoke 30 which is drivingly connected to the rearward end of a vehicle front drive shaft 32 by means of a universal joint coupling 34. The front drive shaft 32 has a forward end connected to an input shaft or yoke 36 of a vehicle front differential unit 38 by means of a universal joint coupling 40 and is adapted to divide torque received from drive shaft 32 between the vehicle front wheels 42.

Figure 2:
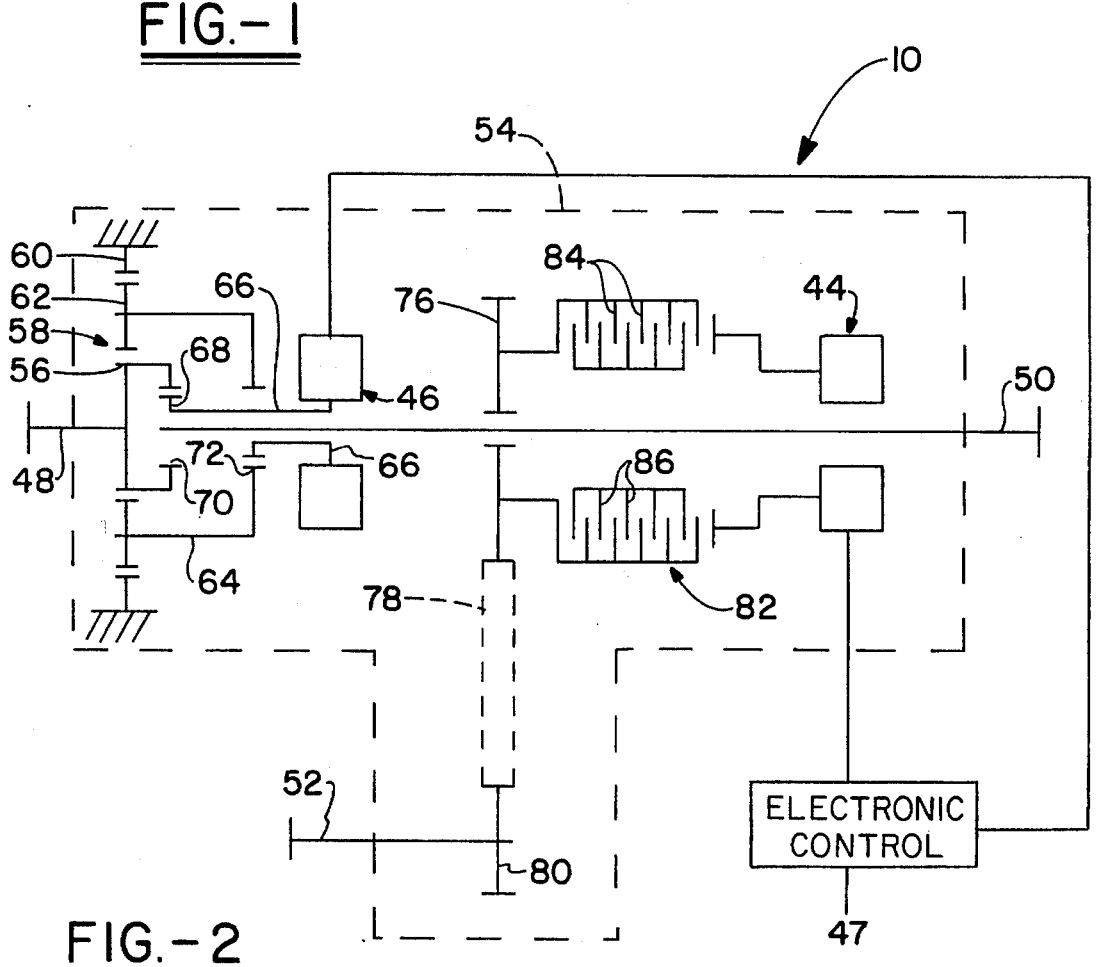
FIG. 2 is a schematic diagram illustrating one example of a torque transfer case which can incorporate the clutch actuating device of the present invention.

Referring now to FIG. 2, there is shown a schematic diagram of the internal components of the transfer case 10 of FIG. 1, which incorporates a clutch actuation device, generally indicated at 44. Transfer case 10 further includes an electric range shift actuator, generally indicated at 46 which may be used in conjunction with a microprocessor-based electronic control system 47 to shift the transfer case 10 between high range, neutral and low range operating modes, as discussed in greater detail in U.S. Pat. No. 5,199,325 issued Apr. 6, 1993, which is herein expressly incorporated by reference. As shown in FIG. 2, the transfer case 10 includes an input shaft 48 coupled to the output shaft of the vehicle transmission 12 (shown in FIG. 1), a rear output shaft 50 for connection to the vehicle rear drive shaft 18, and a front output shaft 52 for connection to the vehicle front drive shaft 32.

The input shaft 48 is rotatably supported at the forward end of a transfer case housing 54 and incorporates a sun gear 56 which forms part of a planetary gear reduction assembly, generally indicated at 58, used to achieve the low gear operating range. Planetary assembly 58 includes a ring gear 60 which is fixed relative to housing 54, and a plurality of circumferentially spaced planet gears 62 which are individually rotatably supported by planet carrier 64. Rear output shaft 50 extends forwardly into housing 54 and carries at its forward end an axially movable range shift sleeve 66 having external splines 68 for engagement with either internal splines 70 connected to the input shaft 48, or internal splines 72 connected to the planet carrier 64. When range shift sleeve 66 is connected to the input shaft 48, as illustrated above axis 74 in FIG. 4, there is a direct drive connection between input shaft 48 and the rear output shaft 50 to define the high speed range. When shift sleeve 66 is connected to planet carrier 64, as shown below axis 74 in FIG. 4, the planetary gear assembly 58 introduces a predetermined gear reduction to define the low speed range. When shift sleeve 66 is located at an intermediate position (not shown) between the input shaft splines 70 and the planet carrier splines 72, transfer case 10 is in neutral. The specific construction and known operation of range shift sleeve 66 is discussed in greater detail in U.S. Pat. No. 5,199,325.

The transfer case 10 further comprises a first drive sprocket 76 which is rotatably supported on a central portion of the rear output shaft 50 and is connected by a drive chain 78 to drive a second drive sprocket 80 which is rotatably supported within transfer case housing 54 and connected to drive the front output shaft 52. A multi-disc four-wheel drive clutch, generally indicated at 82, is provided to control torque input to the front output shaft 52, and includes a first group of clutch plates 84 which, while axially movable, are secured for rotation with the first drive sprocket 76. A second group of clutch plates 86 are secured for rotation with the rear output shaft 50, are also axially movable. Four-wheel drive clutch 82 is actuated by clutch actuating device 44, as subsequently discussed in greater detail. When clutch 82 is disengaged the vehicle is operated in a two-wheel drive mode, with all the driving torque directed to the rear wheels of the vehicle via output shaft 50, vehicle rear drive shaft 18 and rear differential 24. When clutch 82 is fully engaged, a direct drive connection is provided between rear output shaft 50 and front output shaft 52 so that torque is distributed to the front and rear wheels of the vehicle based upon the traction available at each wheel. The various modes of operation, which may include an auto "on-demand" four-wheel drive mode, are discussed in greater detail in U.S. Pat. No. 5,199,325.

Figure 3:
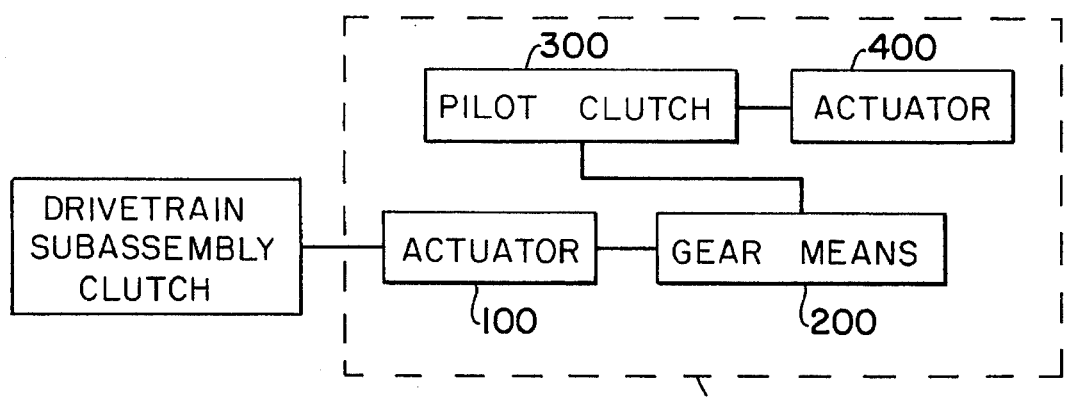
FIG. 3 is a schematic diagram illustrating the sub-systems included in the clutch actuating device of the present invention.

The clutch actuating device of the present invention, which is indicated generally at 44 in FIG. 2, comprises a number of subsystems which are illustrated schematically in FIG. 3 and include the following: an actuator mechanism 100 which comprises a pair of rotating members which are free to rotate relative to a drive member of the drivetrain subassembly and relative to one another causing an axial translation of one member relative to the other so as to engage or disengage the vehicle drivetrain subassembly clutch; a gear means 200 which is used to differentially drive the individual rotating members of the actuator mechanism 100 and to control the direction of rotation of the rotating members relative to the drive member; a pilot clutch means 300 comprising a pair of pilot clutches which are used to restrict rotation of selected members of the gear means so as to produce the desired relative rotation and the corresponding axial translation between the rotating members of the actuator mechanism 100; and a pilot clutch activation means 400 which is used to selectively activate individual pilot clutches of pilot clutch means 300. The rotating members of actuator mechanism 100 preferably include ramp surfaces, but may alternatively include mating internal and external threads which engage one another in a linear screw arrangement; the gear means 200 comprises a planetary gear set in combination with a bevel gear set; the pair of pilot clutches of clutch means 300 may be constructed of a variety of configurations including first and second sets of rotatable disks, first and second sets of slotted rotatable disks, or individual disks; and the pilot clutch activating means 400 may comprise a pair of electromagnets and associated coils or a single electromagnet with concentric coils. Further, the pilot clutch activating means 400 may also comprise mechanical, hydraulic or pneumatic systems. The numerical designations of the various subsystems depicted schematically in FIG. 4 will remain the same throughout each of the subsequently discussed embodiments of the clutch actuating device 44.

Figure 5:
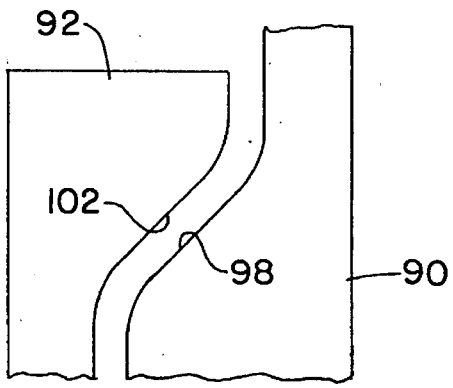
FIG. 5 a view taken along line 5—5 in FIG. 4 illustrating the single directional ramp surfaces included in the embodiment of the clutch actuating device illustrated in FIG. 4.
Figure 4:
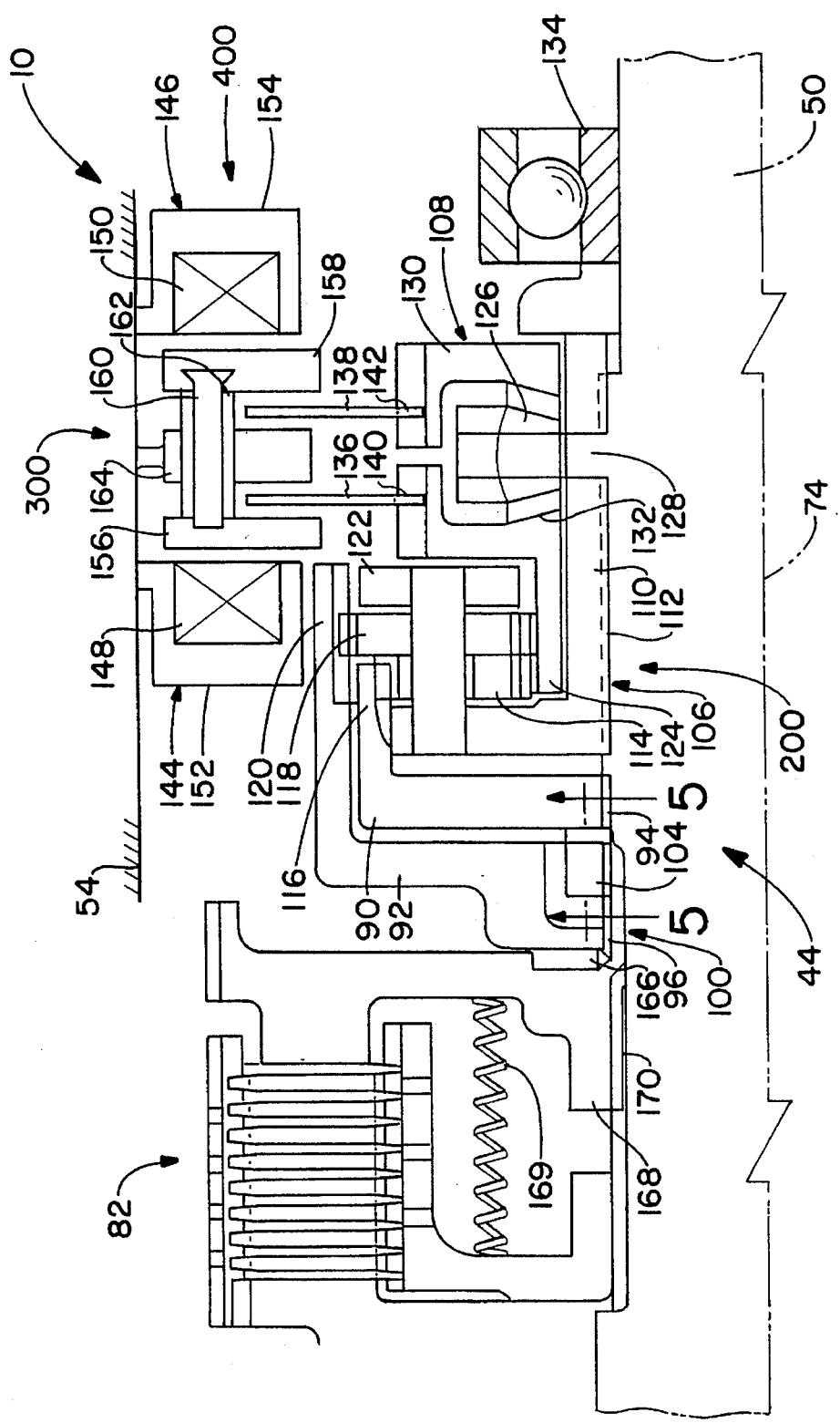
FIG. 4 is a cross-sectional view illustrating a portion of the exemplary torque transfer case of FIG. 2 which incorporates the clutch actuating device of the present invention, with the portion of the torque transfer case shown being depicted above the rotational centerline of the rear output shaft of the transfer case.

Referring now to FIG. 4, a torque transfer case 10, comprising an illustrative vehicle drivetrain subassembly, will be discussed with particular attention to the structural features and functions of the clutch actuating device 44 according to a preferred embodiment of the present invention. It is noted that only a portion of transfer case 10 is shown and is depicted above the centerline axis 74 of rear output shaft 50. The actuator mechanism 100 of clutch actuating device 44 comprises first and second rotating members 90 and 92, respectively, which are rotatably mounted to output shaft 50 by bushings 94 and 96, respectively, or alternatively may be mounted to shaft 50 by bearings or other conventional means. Accordingly, members 90 and 92 are free to rotate relative to one another and relative to output shaft 50. Members 90 and 92 include axially facing ramp surfaces 98 and 102, respectively, which engage one another as indicated generally at 104 so as to produce axial translation of member 92 relative to member 90 for purposes of engaging or disengaging clutch 82 of transfer case 10. Ramp surfaces 98 and 102 are single directional, as illustrated in FIG. 5.

Gear means 200 includes a planetary gear set, indicated generally at 106, and a bevel gear set indicated generally at 108. Planetary gear set 106 includes a planet carrier 110 which is connected to output shaft 50 via a splined connection 112. A first plurality of circumferentially spaced planet gears 114 are individually rotatably mounted on planet carrier 110 and meshingly engage a ring gear 116 which is attached to rotating member 90. In a preferred embodiment, rotating member 90 and ring gear 116 may comprise a one-piece construction and may be made using a powdered metallic alloy. A second plurality of circumferentially spaced planet gears 118 are individually rotatably mounted on planet carrier 110 and meshingly engage a ring gear 120 which is attached to rotating member 92. In a preferred embodiment, ring gear 120 and rotating member 92 may comprise a one-piece construction and may be made using a powdered metallic alloy. Planet gears 114 and 118 are axially restrained on planet carrier 110 by a plurality of circumferentially spaced thrust washers 122, or alternatively by a single annular thrust washer. Planetary gear set 106 further includes a sun gear 124 which is mounted to planet carrier 110 in a slip fit and may therefore rotate relative to carrier 110. Sun gear 124 includes an inner portion of substantially constant diameter which meshingly engages planet gears 114 and 118. Alternatively, sun gear 124 may be configured so that the portions engaging planet gears 114 and 118 are constructed of different diameters having different numbers of teeth, for purposes of altering the gear ratios between sun gear 124 and ring gears 116 and 120. Bevel gear set 108 includes a pinion gear 126 which is secured to planet carrier 110 by one or more pins 128 so that pinion gear 126 rotates with carrier 110 and output shaft 50. Bevel gear set 108 further includes an aft bevel side gear 130 which is mounted to planet carrier 110 in a slip fit and meshingly engages pinion gear 126. Sun gear 124 incorporates bevel gear teeth which form a second, forward bevel side gear 132 which meshingly engages pinion gear 126. Bevel side gear 130 and planet carrier 110 are axially restrained by bearing assembly 134. Pilot clutch means 300 of clutch actuating device 44 comprises first and second pilot clutches 136 and 138, respectively, which each comprise a single annular rotatable plate. Alternatively pilot clutches 136 and 138 may each comprise a plurality of annular rotatable plates. Pilot clutch 136 is connected to sun gear 124 via a splined connection 140 and pilot clutch 138 is connected to aft bevel side gear 130 via a splined connection 142. The means for selectively activating pilot clutches 136 and 138, indicated generally at 400, comprises electromagnets 144 and 146 having coils 148 and 150, respectively. Coils 148 and 150 are contained within housings 152 and 154, respectively, and are supported by transfer case housing 54. An annular armature plate 156 is disposed axially between electromagnet 144 and pilot clutch 136 and an annular armature plate 158 is disposed axially between electromagnet 146 and pilot clutch 138. Armature plates 156 and 158 are secured to one another by a plurality of circumferentially spaced screws 160, with each screw 160 being surrounded by a separate spacer or sleeve member 162. An annular reaction plate 164 is disposed axially between pilot clutches 136 and 138 and is supported by transfer case housing 54. Plate 164 includes a plurality of holes for accepting screws 160 and sleeve members 162. Sleeve members 162 are adapted to engage the facing surfaces of armature plates 156 and 158 so as to establish a predetermined spacing between plates 156 and 158 and to maintain plates 156 and 158 in a substantially parallel relationship with one another. Additionally plates 156 and 158 are each separated by a suitable air gap from the corresponding coil housings 152 and 154, respectively.

During operation of transfer case 10, when neither of pilot clutches 136 and 138 are activated, each element of planetary gear set 106 and bevel gear set 108 rotate with output shaft 50 about axis 74 and no relative rotation exists between ring gears 116 and 120. Accordingly no relative rotation exists between rotating members 90 and 92. However, activation of either of pilot clutches 136 and 138 causes relative rotation to occur between members 90 and 92 with the corresponding ramp surfaces 98 and 102 engaging one another so as to produce axial translation of members 92 and 90 relative to one another in response to the relative rotation between members 92 and 90. Energizing coil 150 of electromagnet 146 attracts armature plate 158 which in turn causes the rotatable plate of pilot clutch 136 to be compressed between armature plate 156 and annular reaction plate 164. Activating pilot clutch 136 in this manner during operation of transfer case 10 retards or prevents the rotation of sun gear 124 so that sun gear 124 rotates slower than, or underruns, output shaft 50. Due to the engagement of planet gears 114 with sun gear 124 and ring gear 116 and the engagement of planet gears 118 with sun gear 124 and ring gear 120, ring gears 116 and 120 also rotate slower than output shaft 50. Sun gear 124 combines with ring gears 116 and 120 to define first and second gear ratios, respectively, which are different from one another. Accordingly, ring gears 116 and 120 also rotate relative to one another. Additionally, members 92 and 90, which are attached to ring gears 120 and 116 respectively, also rotate relative to one another. The relative rotation between members 92 and 90 causes member 92 to be axially translated relative to member 90 due to the engagement of ramp surfaces 102 and 98. Member 92 is translated away from member 90 and toward clutch 82, or to the left in FIG. 4. As shown in FIG. 4, a thrust bearing 166 is disposed axially between rotating member 92 and a clutch pressure plate 168. Pressure plate 168 is mounted to output shaft 50 via a splined connection 170 which permits a limited axial movement of pressure plate 168. Accordingly, when member 92 moves toward clutch 82, member 92 engages pressure plate 168 through thrust bearing 166 and pressure plate 168 exerts an axial force on clutch 82 so as to engage clutch 82. Thrust bearing 166 reduces the frictional forces occurring due to the relative rotation of member 92 and pressure plate 168 and therefore enhances, or increases the axial clamp lcad which may be applied to clutch 82 through pressure plate 168 and rotating member 92. The clutch 82 is disengaged upon deactivation of pilot clutch 136 by natural plate wobble or by means of an optional spring 169 acting on pressure plate 168. Alternatively, the ramp angles and material of ramp surfaces 98 and 102 of members 90 and 92, respectively, are selected so that the actuating force applied to clutch 82 will be maintained after pilot clutch 136 has been deactivated. Energizing coil 148 of electromagnet 144 attracts armature plate 156 which in turn causes the rotatable plate of pilot clutch 138 to be compressed between armature plate 158 and reaction plate 164, thereby grounding the rotatable plate of pilot clutch 138 to transfer case housing 54. Grounding pilot clutch 138 retards or prevents the rotation of bevel side gear 130, causing gear 130 to rotate slower than, or underrun shaft 50. Due to the engagement of bevel side gears 130 and 132 with pinion gear 126, the retardation of side gear 130 causes side gear 132 and sun gear 124 to rotate faster than, or overrun output shaft 50. Accordingly, ring gears 116 and 120 and the corresponding attached members 90 and 92 also rotate faster than output shaft 50. Additionally, members 90 and 92 rotate relative to one another due to the different planetary gear ratios acting between sun gear 124 and ring gears 116 and 120. In this situation, the relative rotation between members 92 and 90, which are both overrunning shaft 50, causes member 92 to translate away from clutch 82 so as to unload or disengage clutch 82. The configuration of ramp surfaces 98 and 102 ensures that the position of member 92 relative to member 90 will be maintained after pilot clutch 138 has been deactivated. Although the absolute direction of rotation of members 92 and 90 is always the same as shaft 50, the presence of bevel gear set 108 allows the direction of rotation of members 90 and 92 relative to shaft 50 to be controlled, i.e., members 90 and 92 may be forced to overrun or underrun shaft 50. It should be understood that the foregoing discussion corresponds to a given direction of rotation of rear output shaft 50 and a corresponding direction of motion of the associated vehicle (not shown), and that for an opposite direction of rotation of shaft 50 the engaging and disengaging roles of pilot clutches 136 and 138 are reversed, i.e., activating pilot clutch 138 causes member 92 to translate axially relative to member 90 so that pressure plate 168 exerts an axial force on clutch 82 so as to engage clutch 82, whereas activating pilot clutch 136 causes clutch 82 to be disengaged. Activation of pilot clutches in this as well as the other embodiments of the invention may be performed by the electronic control system 47 as an example, or may be activated manually by the vehicle operator.

The main advantage of the clutch actuating device 44 is that the force and energy required by the operator or vehicle control means to engage clutch 82 is much smaller than that of prior devices since most of the actuation energy required is supplied by the rotating output shaft 50 on which clutch 82 is mounted. This permits a reduction in cost, size and weight of the included elements of clutch actuating device 44 relative to prior mechanisms. Additionally, finite variable control of clutch torque may be easily and precisely achieved since no over center devices are employed as in typical prior ball ramp or other self-energizing clutch actuating devices.

Figure 6:
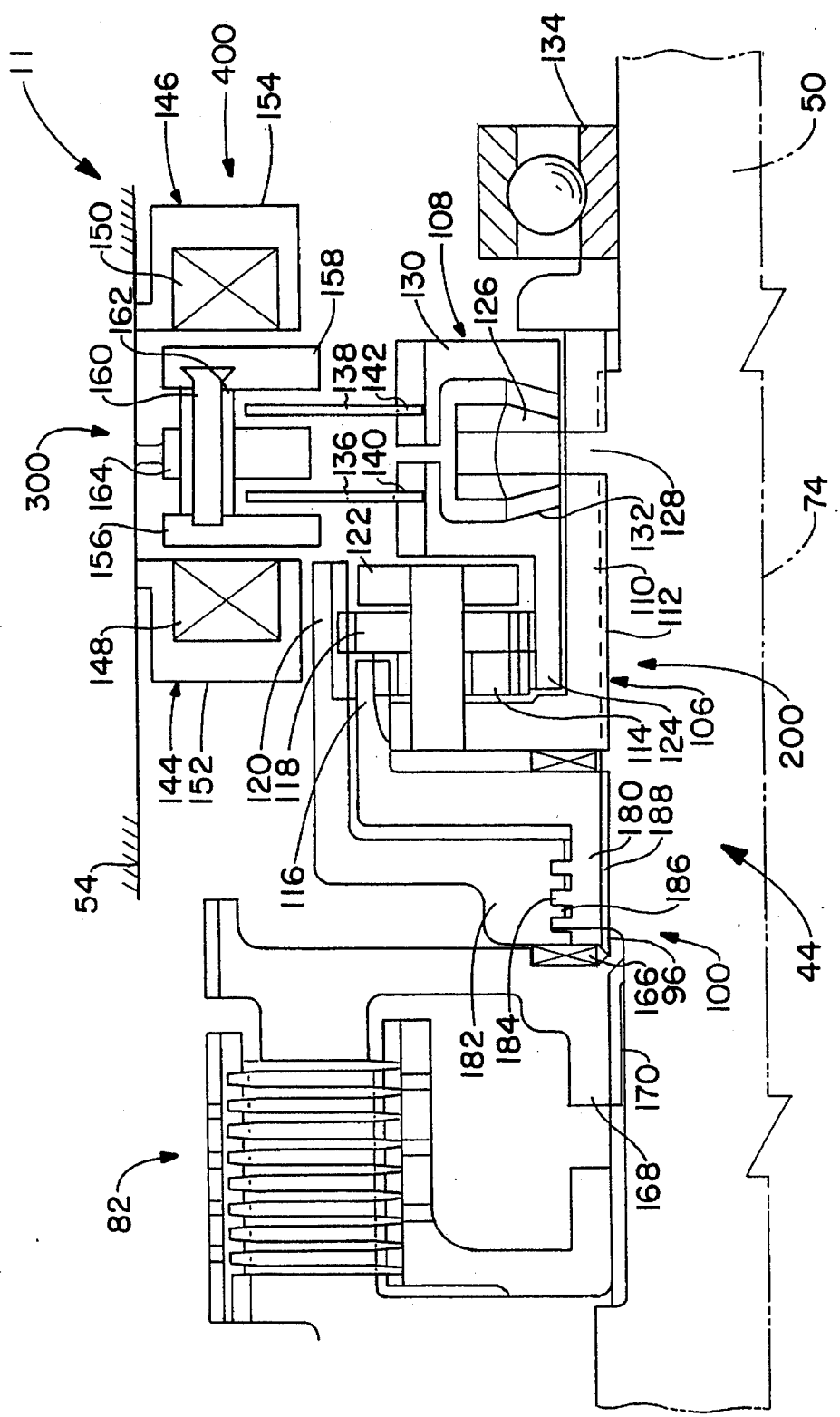
FIG. 6 is a cross-sectional view illustrating a portion of another torque transfer case which incorporates the clutch actuating device according to another preferred embodiment, with the portion of the torque transfer case shown being depicted above the rotational centerline of the rear output shaft of the transfer case.

Referring now to FIG. 6 another embodiment of the clutch actuating device 44 of the present invention is illustrated in another torque transfer case 11 which includes a gear means 200, a pilot clutch means 300 and a pilot clutch activating means 400 which are identical to those illustrated in the embodiment of FIG. 4. Identical reference numerals have been used in FIG. 6 to indicate elements which are common to those illustrated in FIG. 4. In this embodiment, the actuator mechanism 100 illustrated in FIG. 6 comprises first and second rotating members 180 and 182, respectively, which are threaded screw members. Threaded screw members 180 and 182 engage one another in a linear screw arrangement defined by external threads 184 of member 180 and mating internal threads 186 of member 182. Member 180 is rotatably mounted to output shaft 50 via a bushing 188, or alternatively by bearings or other conventional means. Screw members 180 and 182 are attached to ring gears 116 and 120, respectively. In a preferred embodiment, member 180 and ring gear 116 may comprise a one-piece construction and may be made using a powdered metallic alloy. Similarly, member 182 and ring gear 120 may comprise a one-piece construction and may be made using a powdered metallic alloy. Members 180 and 182 are free to rotate relative to shaft 50 and relative to one another. Due to the linear screw arrangement defined by mating threads 184 and 186, members 180 and 182 translate axially relative to one another in response to relative rotation occurring between members 180 and 182. The operation of the clutch actuating device 44 illustrated in FIG. 6 is otherwise the same as described previously with respect to the embodiment of FIGS. 4 and 5. Accordingly, activation of either pilot clutches 136 and 138 causes relative rotation to occur between members 180 and 182, resulting in axial translation of members 180 and 182 relative to one another. Activating pilot clutch 136, so as to ground the rotatable plate of pilot clutch 136, causes sun gear 124 and ring gears 116 and 120 to underrun output shaft 50. Additionally, ring gears 116 and 120, as well as attached members 180 and 182, rotate relative to one another due to the action of planetary gear set 106. This relative rotation causes member 182 to be translated towards clutch 82 so as to exert an actuation force on clutch 82 via thrust bearing 166 and pressure plate 168. Activating pilot clutch 138, so as to ground the rotatable plate of pilot clutch 138, causes bevel side gear 130 to underrun shaft 50 which in turn causes sun gear 124, ring gears 116 and 120, and members 180 and 182 to rotate faster than output shaft 50. Additionally, members 180 and 182 rotate relative to one another, due to planetary gear set 106, so that member 182 translates axially away from clutch 82 so as to unload or disengage clutch 82. The pitch angle and material of external threads 184 of member 180 and the internal threads 186 of member 182 are selected so that the actuating force applied to clutch 82 will be maintained after pilot clutch 136 has been deactivated. Additionally, it should be understood that the foregoing discussion corresponds to a given direction of rotation of shaft 50 and a corresponding direction of motion of the associated vehicle, and that for an opposite direction of rotation of shaft 50 the engaging and disengaging roles of pilot clutches 136 and 138 are reversed.

Figure 8:
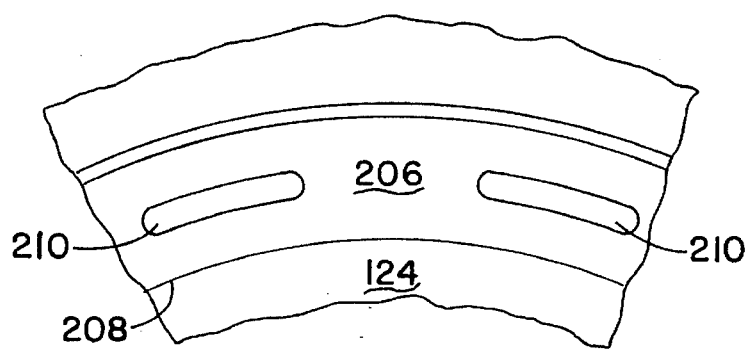
FIG. 8 is a partial transverse sectional view taken along line 8—8 in FIG. 7.
Figure 9:
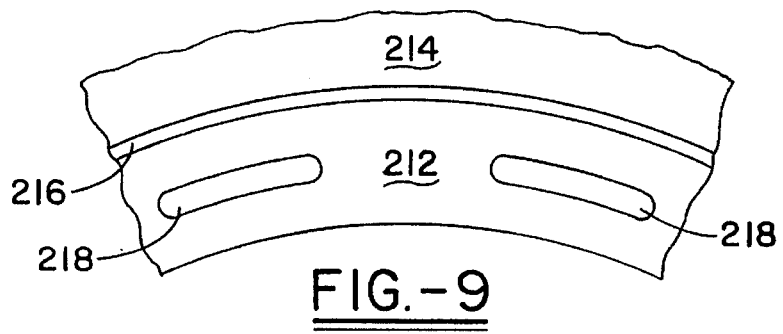
FIG. 9 is a partial transverse sectional view taken along line 9—9 in FIG. 7.
Figure 7:
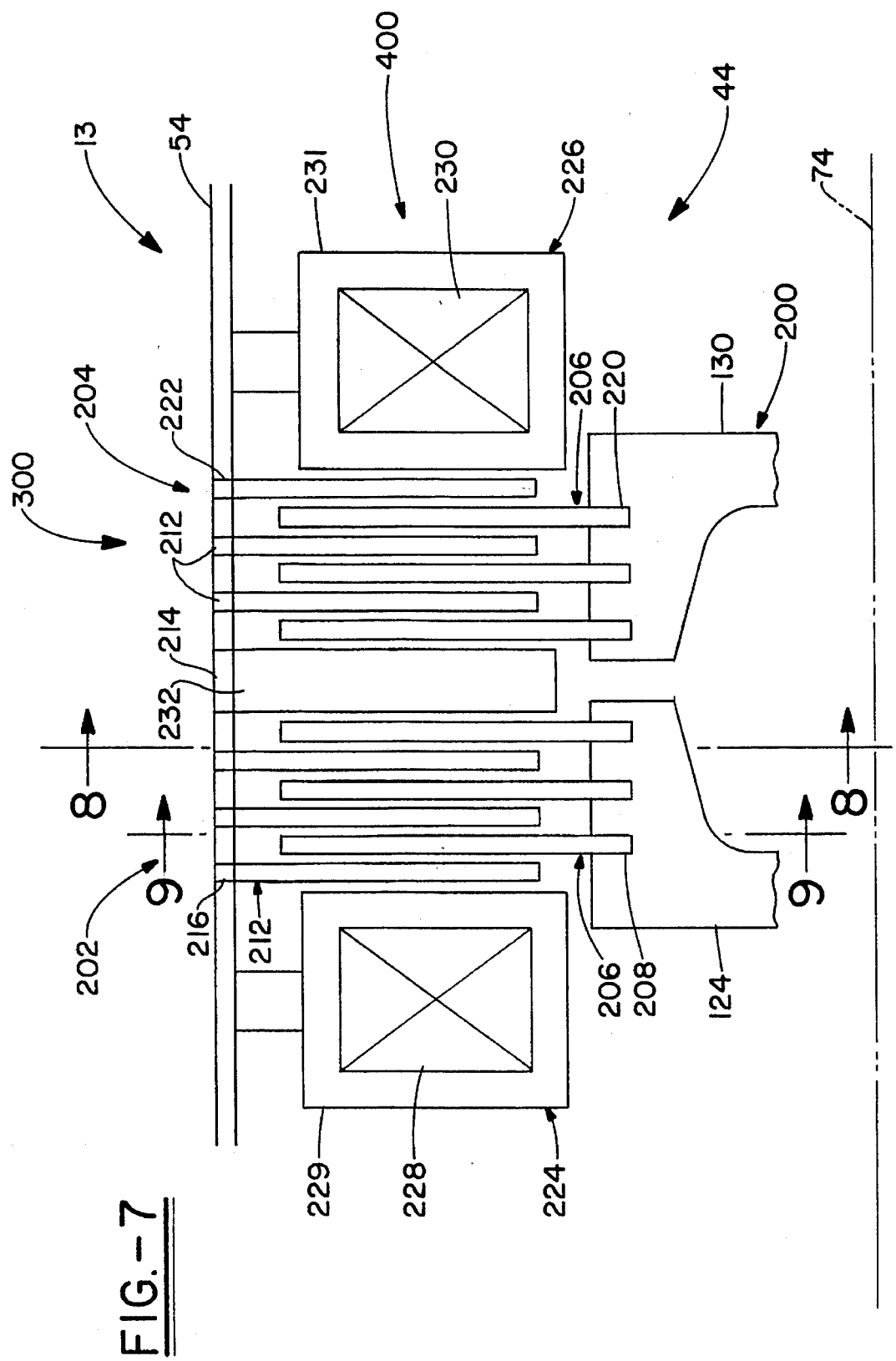
FIG. 7 is a partial cross-sectional view illustrating the pilot clutch and the pilot clutch activating means incorporated in yet another preferred embodiment of the clutch actuating device of the present invention.

Referring now to FIGS. 7–9 a portion of another torque transfer case 13 is illustrated which incorporates another embodiment of the clutch actuating device 44. The clutch actuating device 44 illustrated in FIG. 7 includes the gear means 200 incorporated in the embodiments illustrated in FIGS. 4 and 6 (partially shown in FIG. 7), and may be used with the actuator mechanism 100 illustrated in either FIGS. 4 or 6. However, the pilot clutch means 300 and pilot clutch activating means 400 illustrated in FIG. 7 differ from those of previous embodiments and are specifically constructed as follows. Pilot clutch means 300 includes a first pilot clutch, indicated generally at 202, and a second pilot clutch, indicated generally at 204. Pilot clutch 202 includes a first set of rotatable clutch plates 206 which are attached to sun gear 124 via splined connections 208. Clutch plates 206 include a plurality of circumferentially spaced and circumferentially extending slots 210, as shown in FIG. 8. Pilot clutch 202 also includes a second set of plates 212 which are connected to stationary support structure 214 of transfer case housing 54 via splined connections 216. As shown in FIG. 9, plates 212 include a plurality of circumferentially spaced and circumferentially extending slots 218. Plates 206 and 212 of pilot clutch 202 are interleaved with one another, with each plate 202 being free to rotate about axis 74 of shaft 50 (not shown in FIG. 7) with sun gear 124 and each plate 212 being grounded to transfer case housing 54.

Pilot clutch 204 also includes a plurality of plates 206 which are connected to an outer portion of aft bevel side gear 130 via splined connections 220 and a plurality of plates 212 which are connected to transfer case support structure 214 via splined connections 222. As with pilot clutch 202, plates 206 and 212 of pilot clutch 204 are interleaved with one another. The pilot clutch activating means 400 includes a first electromagnet 224, having a core 228 contained within housing 229 which is grounded to transfer case housing 54, and a second electromagnet 226 having a core 230 contained within housing 231 which is also grounded to transfer case housing 54. Unlike the pilot clutch activating means 400 of prior embodiments, the activating means 400 illustrated in FIG. 7 does not include first and second armature plates and the associated plurality of screw members and sleeve members illustrated in FIGS. 4 and 6. Also, the reaction plate 164 of FIGS. 4 and 6 is replaced by floating shield plate 232 which is used in conjunction with clutch plates 206 and 212 as subsequently described.

Slots 210 of plates 206 cooperate with slots 218 of plates 212 such that when either coil 228 or 230 is energized, the magnetic field generated will form a flux path which starts at one pole of the corresponding electromagnet 224 or 226, respectively, and travels through corresponding ones of plates 206 and 212 until the field is stopped by floating shield plate 232. The field is then forced to wrap around and return to the opposite pole of the corresponding one of electromagnets 224 and 226. The positioning of slotted plates 206 and 212 in pilot clutches 202 and 204 allows the magnetic field of electromagnets 224 and 226 to act upon each adjacent pair of plates 206 and 212 separately. In operation, energizing coil 228 of electromagnet 224 causes adjacent ones of slotted plates 206 and 212 of pilot clutch 202 to be attracted to one another, so as to ground plates 206 to transfer case housing 54. Activating pilot clutch 202 so as to ground plates 206 causes the sun gear 124 and ring gears 116 and 120 to underrun shaft 50 as described relative to previous embodiments. Accordingly, activating pilot clutch 202 will cause the four-wheel drive clutch 82 (not shown in FIG. 7) to be loaded or engaged, either by rotating member 92 of the embodiment of FIG. 4 or the rotating threaded screw member 182 of the embodiment of FIG. 6. Energizing coil 230, so as to activate pilot clutch 204, results in clutch 82 being unloaded or disengaged, in the manner described with respect to previous embodiments. Further, as with previous embodiments, the foregoing discussion corresponds to a given direction of rotation of shaft 50 and the engaging and disengaging roles of pilot clutches 202 and 204 would be reversed for an opposite rotation of shaft 50.

Figure 10:
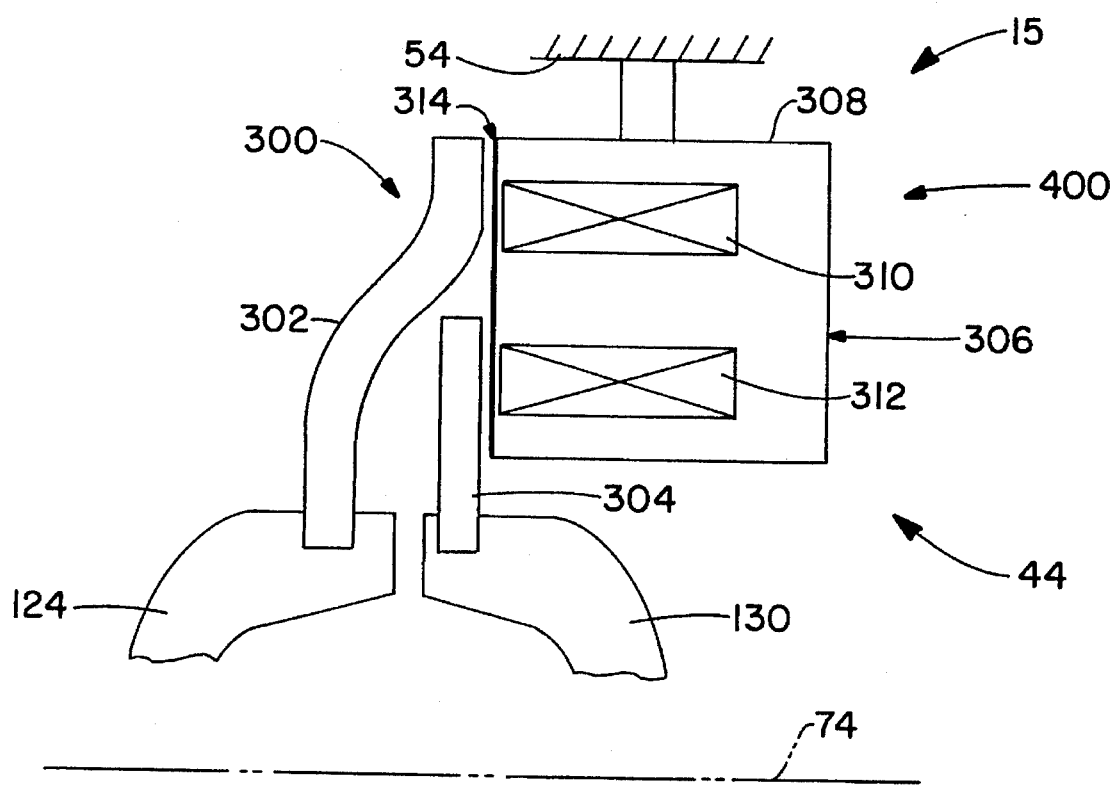
FIG. 10 is a partial cross-sectional view illustrating the pilot clutch and pilot clutch activating means according to still another preferred embodiment of the clutch actuating device of the present invention.

Referring now to FIG. 10, a portion of a torque transfer case 15 is illustrated which incorporates another embodiment of the clutch actuating device 44. The embodiment illustrated in FIG. 10 includes a pilot clutch means 300 and pilot clutch activating means 400 which differ from those of the previously discussed embodiments, and which may be used in conjunction with either of the actuator mechanisms 100, and the gear means 200, illustrated in previous embodiments. Pilot clutch 300 includes a first pilot clutch 302, comprising a single rotatable plate, which is attached to sun gear 124, and a second pilot clutch 304, comprising a single rotatable plate, which is attached to aft bevel side gear 130. Pilot clutch activating means 400 comprises an electromagnet 306 which includes a housing 308 which is fixedly attached to housing 54 of transfer case 15. Electromagnet 306 further includes first and second coils 310 and 312, respectively, which are concentric with one another. When coils 310 and 312 are de-energized, pilot clutches 302 and 304 are free to rotate with output shaft 50 of transfer case 15.

When coil 310 is energized or turned on, pilot clutch 302 is brought into frictional engagement with housing 308, thereby retarding the rotation of pilot clutch 302. It is noted that either pilot clutch 302 or housing 308, or both, may include a coating, generally indicated at 314, having a high coefficient of friction which enhances the retardation of the rotation of pilot clutch 302. It is noted that similar coatings 314 may be applied to either or both pilot clutch 304 and the corresponding portion of housing 308. Activating pilot clutch 302 so as to retard or prevent the rotation of pilot clutch 302, causes sun gear 124 and ring gears 116 and 120 to underrun shaft 50 as in previous embodiments. Accordingly, clutch 82 is loaded or engaged, with an actuating force being applied by either screw thread member 182 of the embodiment of device 44 illustrated in FIG. 6 or rotating member 92 of the embodiment of device 44 illustrated in FIG. 4, in conjunction with thrust bearing 166 and pressure plate 168. Activating pilot clutch 304 results in sun gear 124 overrunning shaft 50 with the resultant disengagement of clutch 82 as discussed with respect to previous embodiments. Also, as with previous embodiments, the foregoing discussion corresponds to a given direction of rotation of shaft 50 and the engaging and disengaging roles of pilot clutches 302 and 304 would be reversed for an opposite rotation of shaft 50.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, while the clutch actuating device has been illustrated in an "on-demand" type torque transfer case, the clutch actuating device may be used in other types of transfer cases such as a "full-time" four-wheel drive torque transfer case or in other vehicle drivetrain subassemblies such as that associated with a primary vehicle clutch or a vehicle differential. The invention is therefore not limited to specific preferred embodiments as described, but is only limited by the following claims.

What is claimed is:

1. A clutch actuating device for use in a vehicle drivetrain subassembly having a clutch, said clutch actuating device comprising:

first and second rotating members which are rotatably mounted to a rotatable drive member of the vehicle drivetrain subassembly, said first and second rotating members being free to rotate relative to one another and relative to the drive member, said first and second rotating members engaging one another so as to cause axial translation of said first and second rotating members relative to one another in response to relative rotation between said first and second rotating members;

gear means connected to said first and second rotating members for differentially driving said first and second members and for controlling a direction of rotation of said first and second rotating members relative to the drive member;

first and second pilot clutches, each of said pilot clutches comprising at least one rotatable plate, wherein said at least one rotatable plate of each of said first and second pilot clutches is connected to said gear means; and means for selectively activating said first and second pilot clutches so as to selectively ground said first and second pilot clutches and thereby ground said gear means to which said at least one plate is connected such that activating one of said first and second pilot clutches creates relative rotation between said first and second rotating members which causes said second rotating member to translate axially relative to said first rotating member so as to engage the drivetrain subassembly clutch, and wherein activating the other of said first and second pilot clutches creates relative rotation between said first and second rotating members which causes said second rotating member to translate axially relative to said first rotating member so as to disengage the drivetrain subassembly clutch.

2. The clutch actuating device as recited in claim 1, wherein said first and second rotating members have first and second ramp surfaces, respectively, said first and second ramp surfaces engaging one another so as to cause axial translation of said first and second rotating members relative to one another.

3. The clutch actuating device as recited in claim 2, wherein said first and second ramp surfaces comprise single directional ramp surfaces.

4. The clutch actuating device as recited in claim 1, wherein said gear means comprises a planetary gear set which includes:

a planet carrier which is splined to the drive member of the vehicle drivetrain subassembly for rotation therewith;

a sun gear rotatably mounted to said planet carrier;

a first plurality of circumferentially spaced planet gears individually rotatably mounted on said planet carrier and engaging said sun gear and a first ring gear; and a second plurality of circumferentially spaced planet gears individually rotatably mounted to said planet carrier, said second plurality of planet gears being axially spaced from said first plurality of planet gears and engaging said sun gear and a second ring gear;

wherein said first ring gear is attached to said first rotating member and said second ring gear is attached to said second rotating member;

wherein said sun gear and said first ring gear define a first gear ratio and said sun gear and said second ring gear define a second gear ratio which is different from said first gear ratio thereby causing said first and second rotating members to be differentially driven relative to one another in response to rotation of said sun gear relative to said planet carrier.

5. The clutch actuating device as recited in claim 4, wherein said gear means further comprises a bevel gear set which includes:

a pinion gear which is pinned to said planet carrier;

a first bevel side gear which is rotatably mounted to said planet carrier and engages said pinion gear; and a second bevel side gear which is integrally formed with said sun gear and engages said pinion gear.

6. The clutch actuating device as recited in claim 5, wherein:

said at least one rotatable plate of said first pilot clutch is connected to said sun gear; and said at least one rotatable plate of said second pilot clutch is connected to said first bevel side gear.

7. The clutch actuating device as recited in claim 1, wherein said activating means comprises:

a reaction plate fixed to a housing of the drivetrain subassembly and disposed axially between said first and second pilot clutches;

first and second armature plates disposed axially adjacent said first and second pilot clutches, respectively, so that said first pilot clutch is disposed axially between said first armature plate and said reaction plate and said second pilot clutch is disposed axially between said second armature plate and said reaction plate, said first and second armature plates being interconnected to one another;

first and second electromagnets disposed axially adjacent said first and second armature plates, respectively;

wherein energizing a coil of said first electromagnet causes said at least one rotatable plate of said second pilot clutch to be compressed between said reaction plate and said second armature plate thereby grounding said second pilot clutch, and wherein energizing a coil of said second electromagnet causes said at least one rotatable plate of said first pilot clutch to be compressed between said reaction plate and said first armature plate thereby grounding said first pilot clutch.

8. The clutch actuating device as recited in claim 1, wherein said first and second rotating members are threaded screw members which engage one another in a linear screw arrangement so as to permit axial translation of said second threaded screw member relative to said first threaded screw member.

9. The clutch actuating device as recited in claim 1, wherein:

said first pilot clutch comprises a first plurality of plates which are connected to a member of said gear means for rotation therewith, and a second plurality of plates which are attached to a stationary structure of the vehicle drivetrain subassembly, wherein individual ones of said first and second plurality of plates are interleaved with one another;

said second pilot clutch comprises a third plurality of plates which are connected to a second member of said gear means for rotation therewith, and a fourth plurality of plates which are attached to the stationary support structure of the vehicle drivetrain subassembly, wherein individual ones of said third and fourth plurality of plates are interleaved with one another.

10. The clutch actuating device as recited in claim 9, wherein said first member of said gear means is a sun gear and wherein said second member of said gear means is a bevel side gear.

11. The clutch actuating device as recited in claim 9, wherein each of said first, second, third, and fourth plurality of plates include a plurality of circumferentially spaced and circumferentially extending slots.

12. The clutch actuating device as recited in claim 11, wherein said means for selectively activating said first and second pilot clutches comprises first and second electromagnets and a shield plate disposed axially between said first and second pilot clutches.

13. The clutch actuating device as recited in claim 1, wherein said means for selectively activating said first and second pilot clutches comprises a single electromagnet having first and second coils which are concentric with one another.

* * * * *